United States Patent
Gardner, Jr.

(10) Patent No.: US 9,530,358 B2
(45) Date of Patent: Dec. 27, 2016

(54) DISPLAY DEVICE CONTROL BASED ON INTEGRATED AMBIENT LIGHT DETECTION AND LIGHTING SOURCE CHARACTERISTICS

(71) Applicant: Apple Inc., Cupertino, CA (US)

(72) Inventor: William Bryson Gardner, Jr., San Francisco, CA (US)

(73) Assignee: Apple Inc., Cupertino, CA (US)

( * ) Notice: Subject to any disclaimer, the term of this patent is extended or adjusted under 35 U.S.C. 154(b) by 581 days.

(21) Appl. No.: 13/771,779

(22) Filed: Feb. 20, 2013

(65) Prior Publication Data

US 2013/0161489 A1 Jun. 27, 2013

Related U.S. Application Data

(60) Continuation of application No. 13/100,757, filed on May 4, 2011, now Pat. No. 8,384,003, which is a division of application No. 12/002,120, filed on Dec. 13, 2007, now Pat. No. 7,960,682.

(51) Int. Cl.
| | |
|---|---|
| *G09G 1/00* | (2006.01) |
| *G09G 3/34* | (2006.01) |
| *H05B 37/02* | (2006.01) |
| *G09G 3/36* | (2006.01) |

(52) U.S. Cl.
CPC ............ *G09G 3/3406* (2013.01); *H05B 37/02* (2013.01); *G09G 3/3413* (2013.01); *G09G 3/36* (2013.01); *G09G 2320/043* (2013.01); *G09G 2320/064* (2013.01); *G09G 2360/144* (2013.01); *G09G 2360/145* (2013.01)

(58) Field of Classification Search
CPC .............. G09G 3/36; G09G 3/34; G09G 5/00
See application file for complete search history.

(56) References Cited

U.S. PATENT DOCUMENTS

| | | | |
|---|---|---|---|
| 5,157,525 A | 10/1992 | Eaton et al. |
| 5,214,413 A | 5/1993 | Okabayashi et al. |
| 5,216,504 A | 6/1993 | Webb et al. |
| 5,371,537 A | 12/1994 | Bohan et al. |
| 5,446,564 A | 8/1995 | Mawatari et al. |
| 5,776,623 A | 7/1998 | Hung et al. |
| 5,831,693 A | 11/1998 | McCartney, Jr. et al. |
| 5,910,792 A | 6/1999 | Hansen et al. |
| 5,929,845 A | 7/1999 | Wei et al. |
| 6,339,429 B1 | 1/2002 | Schug |

(Continued)

FOREIGN PATENT DOCUMENTS

| | | |
|---|---|---|
| CN | 2870373 | 2/2007 |
| EP | 1335430 | 8/2003 |

(Continued)

OTHER PUBLICATIONS

Hotelling et al., U.S. Appl. No. 13/283,446, filed Oct. 27, 2011.

(Continued)

*Primary Examiner* — Michael Faragalla
(74) *Attorney, Agent, or Firm* — Zachary D. Hadd; Kendall W. Abbasi

(57) ABSTRACT

Systems and methods are provided for a display device including one or more methods for modifying the display brightness by automatically adapting to ambient lighting conditions.

19 Claims, 8 Drawing Sheets

(56) References Cited

U.S. PATENT DOCUMENTS

| | | |
|---|---|---|
| 6,459,436 B1 | 10/2002 | Kumada |
| 6,611,000 B2 | 8/2003 | Tamura et al. |
| 6,664,744 B2 | 12/2003 | Dietz |
| 6,952,195 B2 | 10/2005 | Arakawa |
| 6,995,753 B2 | 2/2006 | Yamazaki et al. |
| 7,012,590 B2 | 3/2006 | Chen |
| 7,064,733 B2 | 6/2006 | Cok et al. |
| 7,068,246 B2 | 6/2006 | Yamazaki et al. |
| 7,460,196 B2 | 12/2008 | Kim et al. |
| 7,825,891 B2 | 11/2010 | Yao et al. |
| 7,960,682 B2 | 6/2011 | Gardner, Jr. |
| 8,194,031 B2 | 6/2012 | Yao et al. |
| 8,384,003 B2 | 2/2013 | Gardner, Jr. |
| 2003/0189211 A1 | 10/2003 | Deitz |
| 2003/0189586 A1 | 10/2003 | Vronay |
| 2004/0036820 A1 | 2/2004 | Runolinna |
| 2004/0095402 A1* | 5/2004 | Nakano .................. 346/102 |
| 2005/0219197 A1 | 10/2005 | Pasqualini et al. |
| 2007/0236485 A1 | 10/2007 | Trepte |
| 2007/0279369 A1* | 12/2007 | Yao .................. G09G 3/3406 345/102 |
| 2008/0055265 A1* | 3/2008 | Bewley ............... G06F 3/04886 345/173 |
| 2008/0248837 A1 | 10/2008 | Kunkel |
| 2008/0284716 A1 | 11/2008 | Edwards et al. |
| 2010/0079426 A1 | 4/2010 | Pance et al. |
| 2012/0218239 A1 | 8/2012 | Yao et al. |

FOREIGN PATENT DOCUMENTS

| | | |
|---|---|---|
| WO | 00/41378 | 7/2000 |
| WO | 2000/41378 | 7/2000 |
| WO | 02/37454 | 5/2002 |
| WO | 2002/37454 | 5/2002 |
| WO | 2007/069107 | 6/2007 |

OTHER PUBLICATIONS

Shedletsky et al., U.S. Appl. No. 13/732,966, filed Jan. 2, 2013.
Jong et al., U.S. Appl. No. 13/686,746, filed Nov. 27, 2012.
Land et al., U.S. Appl. No. 13/746,549, filed Jan. 22, 2012.
Yin, U.S. Appl. No. 13/628,388, filed Sep. 27, 2012.
Zheng, U.S. Appl. No. 13/738,908, filed Jan. 10, 2013.
Zheng, U.S. Appl. No. 13/678,349, filed Nov. 15, 2012.
Zheng, U.S. Appl. No. 13/241,034, filed Sep. 22, 2011.

* cited by examiner

DISPLAY DEVICE CONTROL BASED ON INTEGRATED AMBIENT LIGHT DETECTION AND LIGHTING SOURCE CHARACTERISTICS

This application is a continuation of patent application Ser. No. 13/100,757, filed May 4, 2011, which is a divisional of patent application Ser. No. 12/002,120, filed Dec. 13, 2007, now U.S. Pat. No. 7,960,682, each of which is hereby incorporated by reference herein in its entirety. This application claims the benefit of and claims priority to patent application Ser. No. 13/100,757, filed May 4, 2011, and patent application Ser. No. 12/002,120, filed Dec. 13, 2007, now U.S. Pat. No. 7,960,682.

BACKGROUND

This invention relates to personal display devices and, more particularly, to controlling the display brightness based on the measured ambient light and lighting source characteristics.

The proliferation of compact portable display devices (e.g., portable MP3 players, portable video players, and media capable cellular telephones) has enabled users to interact with such compact portable display devices in environments that have widely varying ambient lighting conditions. Most devices include a display illumination system wherein the brightness level can be varied. Because these devices are often battery-powered and can be used while performing other activities, such as walking or running, it is desirable that the device automatically adjust its display brightness in response to surrounding ambient light conditions to conserve power and to avoid the need for a user to continually manipulate the display brightness manually.

One problem with existing display devices is that their ambient light sensors often detect light generated by their own display light sources or backlights which prevents the device from accurately measuring surrounding ambient light conditions. More particularly, existing display backlight controllers do not account for the emitted light from lighting elements after power to these elements is removed, which is caused by certain physical characteristics of the lighting elements. Accordingly, there is a need for accurately measuring varying ambient light conditions without interference from the device's own display light sources to enable enhanced backlight brightness control.

Another problem with existing portable display devices, such as cellular telephones, is that typical ambient light sensors can occupy space within the device's housing and require an external opening in the housing to enable ambient light detection. A light sensing opening in the housing may expose the device interior to the surrounding environment, increase manufacturing costs, or detract from an otherwise aesthetically pleasing design. Accordingly, there is a need for providing ambient light detection without requiring an additional opening in the device housing to support such detection.

SUMMARY

The invention, in various embodiments, addresses deficiencies in the prior art by providing systems, methods, and devices that enable a display device to sense the amount of ambient light in the vicinity of the display during an interval when the amount of light emitted by a lighting source of the display is minimized or below a defined threshold.

In various aspects, the invention employs light sensors integrated with or positioned within a portion of a transmissive display. A light sensor may include, without limitation, one or more photodiodes and/or phototransistors. The display illumination level may be adjusted automatically based on the amount of ambient light measured by the light sensor. To accurately measure the ambient light without interference from the display illumination, the device processor does not read the sensor values until the display illumination intensity is below a determined light interference level. The light interference level and the time it takes for the illumination intensity to decay to such a level may be determined by the manufacturer of the display. Alternatively, the illumination decay duration can be calculated by the processor using various factors.

In one aspect, a transmissive display includes an integrated light source that illuminates the transmissive display by emitting light during a first illumination period. The display also includes an integrated light sensor that generate a sensor signal based on the amount of light present during a first sensing interval after the first illumination period. Also, the display includes a processor that receives the sensor signal and controls the light source during a second illumination period after the sensing interval based at least in part on the sensor signal.

In one configuration, the path for the ambient light to reach the light sensor includes a path through the transmissive display. In one feature, an illumination period includes a power period, during which the controller applies power to the integrated light source, and a delay period. The delay period may be determined based on the illumination decay characteristics of at least one lighting element of the integrated light source. At least one lighting element may include a light emitting diode (LED). The illumination decay characteristic of the LED may be based on at least one of the physical properties of the LED, the age of the LED, the amount of power applied to the LED during the power interval, and the duration of the power period.

In another configuration, the delay period of the second illumination period is determined based on at least one illumination decay characteristic. The delay period associated with an illumination period may be pre-selected. The delay period associated with an illumination period may be determined based on the amount of time required after the power period for the illumination level to reach a threshold level.

In a further configuration, controlling includes adjusting the duration of the power period of the second illumination period to adjust the illumination intensity of the display. The controlling operation may also include adjusting the amount of power applied to at least one lighting element of the integrated light source to adjust the illumination intensity of the display. In one feature, the integrated light source may include an array of lighting elements.

In another aspect, a transmissive display includes a sensor for generating a sensor signal based on the amount of light present at its receptor, a light source for illuminating the transmissive display, and a processor. The processor repeatedly performs the following i) applying power to the light source during a first period of time, ii) waiting a second period of time for the emitted light intensity from the light source to decay below a light sensor interference level, and iii) sensing the ambient light passing through the transmissive display during a third period of time.

In a further aspect, a display device includes a display assembly consisting of at least three parts: a transmissive display, a light source to illuminate all or part of the display, and a light sensor that can measure the amount of ambient light that passes through the transmissive display into the display device or can measure the amount of light produced by the light source within the display device.

In one configuration, the transmissive display is a liquid crystal display. In another configuration, the light source is an array of white light emitting diodes. In a further configuration, the light sensor is an array of one or more photodiodes or phototransistors that measure white light. In another configuration, the light source is an array of red, blue, and green light emitting diodes. In a further configuration, the light sensor is an array of one or more groups of three photodiodes or phototransistors that measure at least the spectrum of red, blue, and green light emitted by the red, blue and green light emitting diodes of the light source.

Various advantages and applications using ambient light sensing for display illumination control for a display device in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
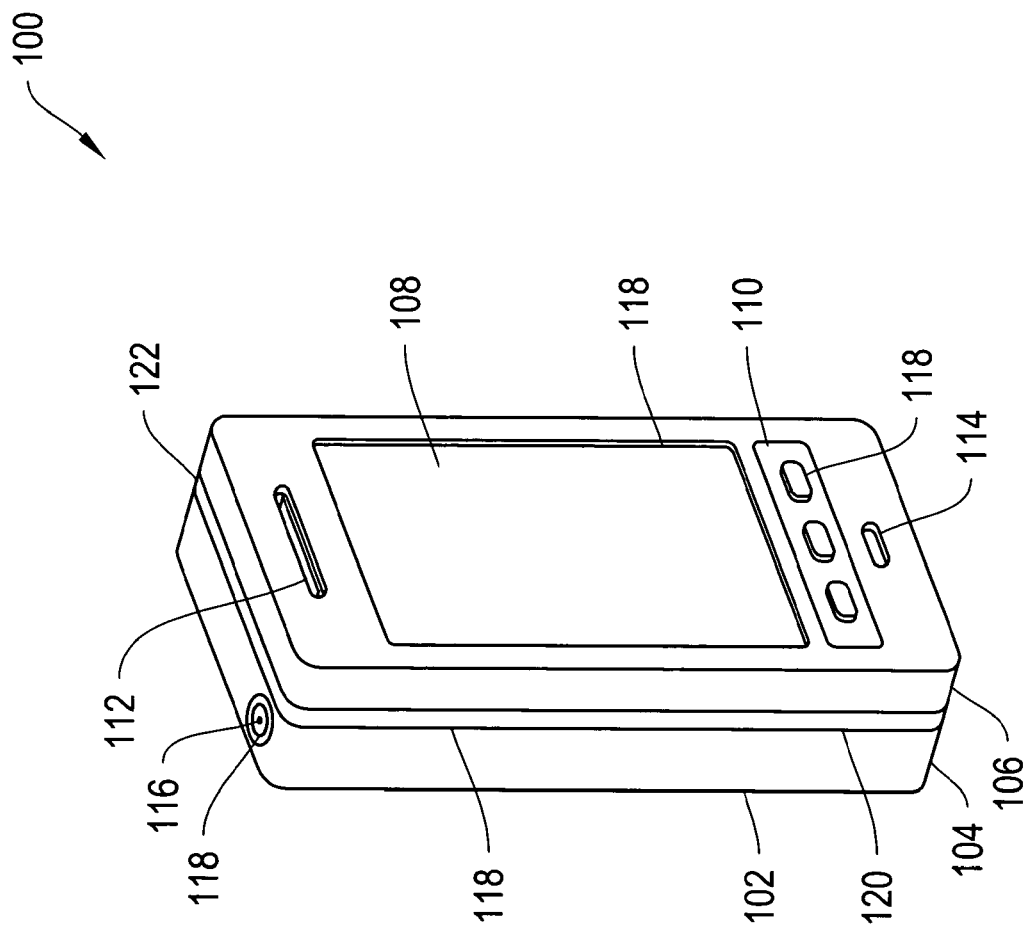
FIG. 1A is a perspective view of a personal display device with an exposed frame assembly according to an illustrative embodiment of the invention.

FIG. 1A is a perspective view of a display device 100 according to an illustrative embodiment of the invention. The display device 100 includes a housing 102, a first housing portion 104, a second housing portion 106, a display 108, a keypad 110, a speaker housing aperture 112, a microphone housing aperture 114, a headphone jack 116, and frame sidewall 122. In certain embodiments, the frame sidewall 122 is the exposed portion of a frame residing within or adjacent to the housing 102 that provides structural support for the media device 100 and various internal components. The housing 102 may also include various gaps 118 that may include openings, separations, vents, or other pathways between elements of the housing 102 which enable the passage of air or sound through the housing 102.

In one embodiment, the housing 102 includes a first housing portion 104 and a second housing portion 106 that are fastened together and/or to the frame sidewall 122 to encase various components of the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, a display lighting element 108 with externally controlled, variable brightness, one or more circuit boards having integrated circuit components, internal radio frequency (RF) circuitry, an internal antenna, a speaker, a microphone, a hard drive, a processor, and other components. Further details regarding certain internal components are discussed herein with respect to FIG. 2. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may include one or more housing apertures 114 to facilitate the reception of sounds, such as voice, for an internal microphone from a display device user.

The display device 100 may include a personal media device and/or wireless communications device such as a cellular telephone, satellite telephone, cordless telephone, personal digital assistant (PDA), pager, portable computer, or any other device capable of wireless communications. In certain embodiments, the display device can include any computing device, dedicated processing device, television, display unit, or like device that includes a display element for the display of information.

The display device 100 may also be integrated within the packaging of other devices or structures such a vehicle, video game system, appliance, clothing, helmet, glasses, wearable apparel, stereo system, entertainment system, or other portable devices. In certain embodiments, device 100 may be docked or connected to a wireless enabling accessory system (e.g., a wi-fi docking system) that provides the display device 100 with short-range communicating functionality. Alternative types of display devices 100 may include, for example, a media player such as an iPod or iPhone that are made available by Apple Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the display device 100 may synchronize with, for example, a remote computing system or server to receive media (using either wireless or wireline communications paths). Wireless syncing enables the display device 100 to transmit and receive media and data without requiring a wired connection. Media may include, without limitation, sound or audio files, music, video, multimedia, and digital data, in streaming and/or discrete (e.g., files and packets) formats.

During synchronization, a host system may provide media to a client system or software application embedded within the display device 100. In certain embodiments, media and/or data is "downloaded" to the display device 100. In other embodiments, the display device 100 is capable of uploading media to a remote host or other client system. Further details regarding the capabilities of certain embodiments of the display device 100 are provided in U.S. patent application Ser. No. 10/423,490, filed on Apr. 25, 2003, the entire contents of which are incorporated herein by reference.

Figure 1B:
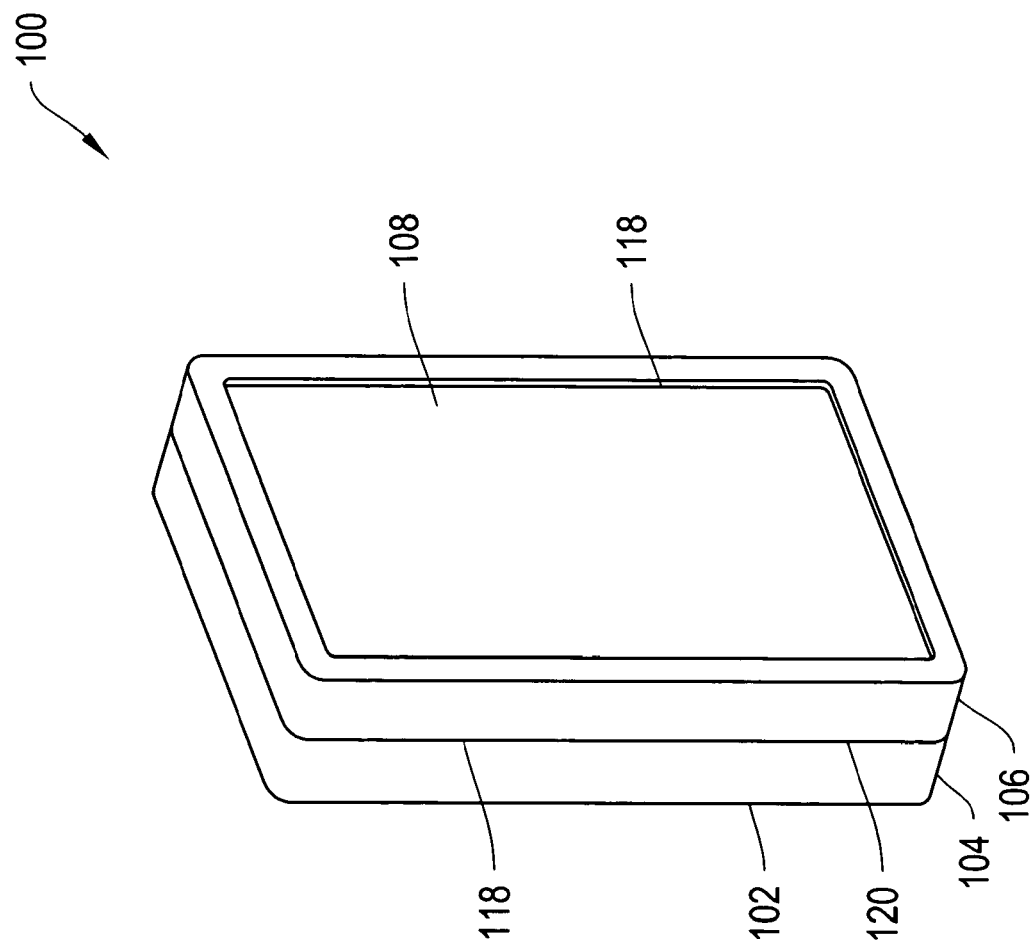
FIG. 1B is another perspective view of a personal display device according to an illustrative embodiment of the invention.

FIG. 1B is another perspective view of a display device 100 according to an illustrative embodiment of the invention. In this embodiment, as opposed to the embodiment of FIG. 1A, the media device's frame and/or the frame's sidewalls are not exposed to an external surface of the device. However, in certain embodiments, the frame is connected internally with at least a portion of one of the first housing portion 104 or the second housing portion 106. Display devices of this type may include touchscreen remote controls, such as a Pronto made available by Royal Philips Electronics of the Netherlands or a handheld GPS receivers made available by Garmin International, Inc. of Olathe, Kans. In certain embodiments, the display 108 includes a graphical user interface (GUI) to enable a user to interact with the display device 100.

Figure 2A:
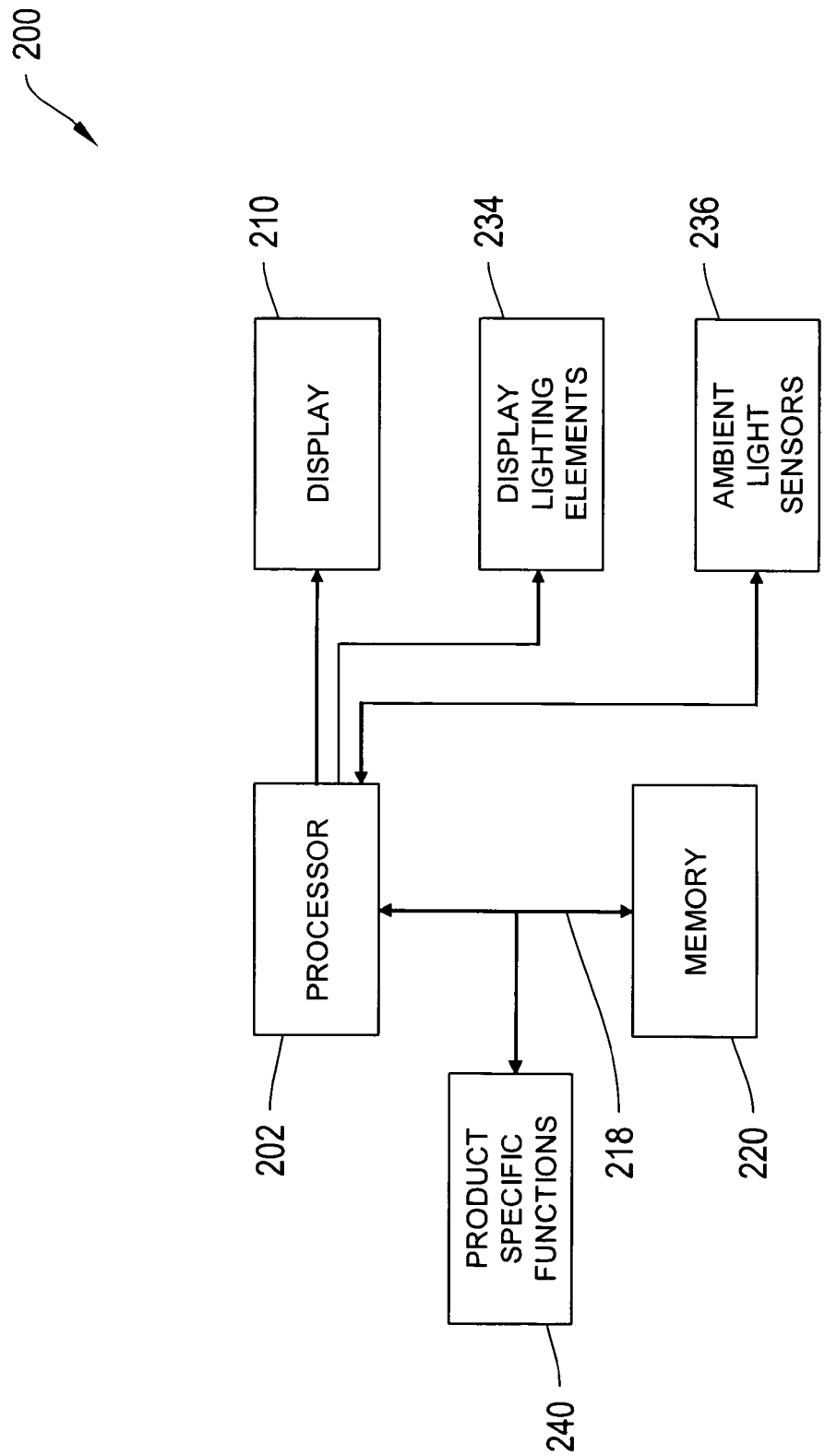
FIG. 2A shows a simplified functional block diagram of a personal display device according to an illustrative embodiment of the invention.

FIG. 2A shows a simplified functional block diagram of the display device 100 according to an illustrative embodiment of the invention. The display device 200 may include a processor 202, display 210, bus 218, memory 220, display lighting 234, light sensors 236, and product-specific functional blocks 240.

Figure 2B:
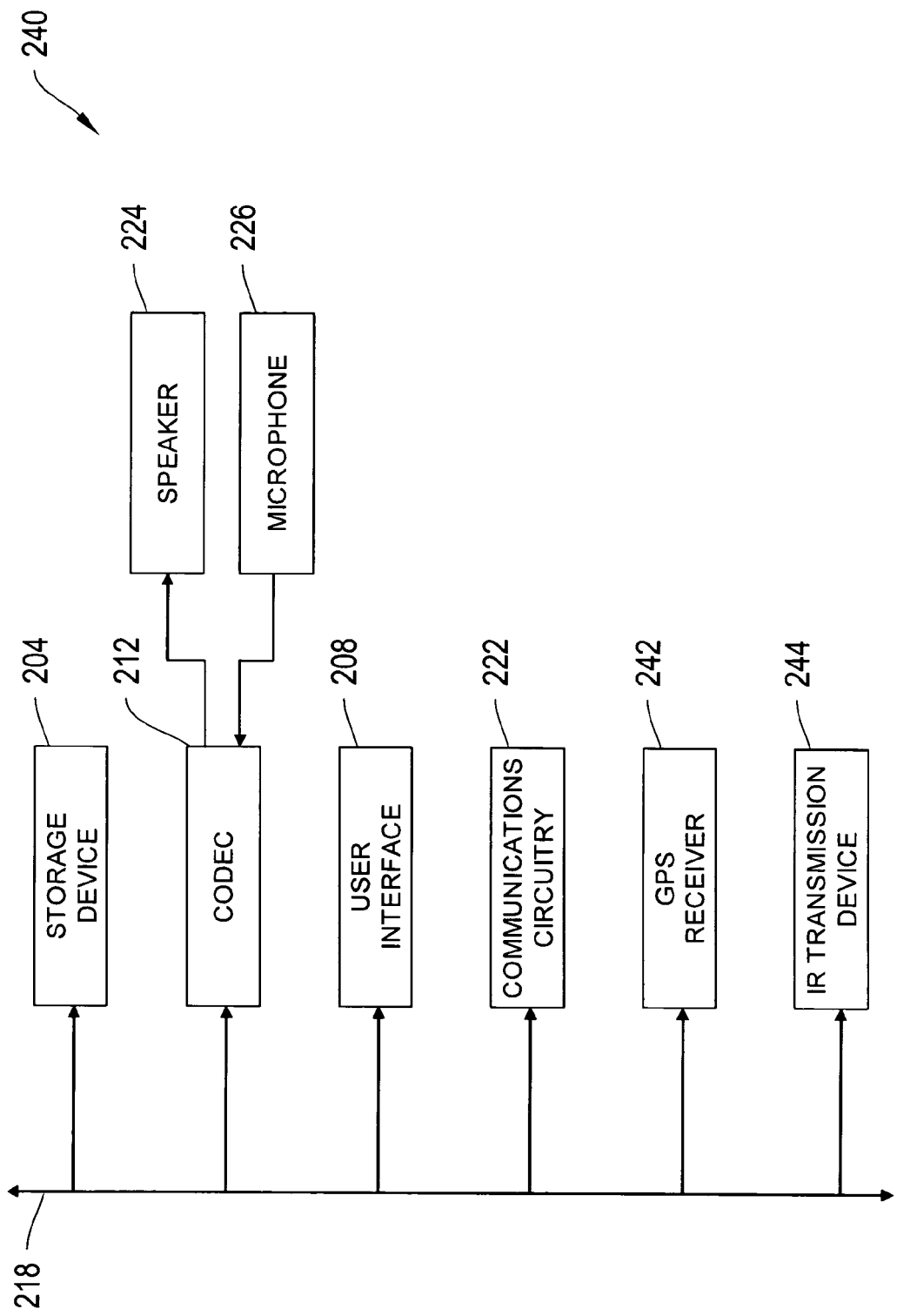
FIG. 2B shows a functional block diagram of certain product-specific functions that may be included in a personal display device according to an illustrative embodiment of the invention.

FIG. 2B shows an embodiment of the product-specific functional blocks 240 that includes the following elements: storage device 204, user interface 208, CODEC 212, communications circuitry 322, a speaker or transducer 224, a microphone 226, a GPS receiver 242 and an infrared transmission device for the control of consumer electronics 244. Processor 202 may control the operation of many functions and other circuitry included in display device 200. Processor 202 may drive display 210 and control the display lighting 234 brightness level.

Storage device 204 may store media (e.g., music and video files), software (e.g., for implanting functions on device 200, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps tracks of podcasts or television shows or other media a user subscribes to), and any other suitable data. Storage device 204 may include one more storage mediums, including for example, a hard-drive, permanent memory such as ROM, semi-permanent memory such as RAM, or cache.

Memory 220 may include one or more different types of memory which may be used for performing device functions. For example, memory 220 may include cache, ROM, and/or RAM. Bus 218 may provide a data transfer path for transferring data to, from, or between at least storage device 204, memory 220, and processor 202. Coder/decoder (CODEC) 212 may be included to convert digital audio signals into an analog signal for driving the speaker 224 to produce sound including voice, music, and other like audio. The CODEC 212 may also convert audio inputs from the microphone 226 into digital audio signals.

User interface 208 may allow a user to interact with the display device 200. For example, the user input device 208 can take a variety of forms, such as a button, keypad, dial, a click wheel, or a touch screen. Communications circuitry 222 may include circuitry for wireless communication (e.g., short-range and/or long range communication). For example, the wireless communication circuitry may be wi-fi enabling circuitry that permits wireless communication according to one of the 802.11 standards. Other wireless network protocols standards could also be used, either in alternative to the identified protocols or in addition to the identified protocol. Other network standards may include Bluetooth, the Global System for Mobile Communications (GSM), and code division multiple access (CDMA) based wireless protocols. Communications circuitry 222 may also include circuitry that enables device 200 to be electrically coupled to another device (e.g., a computer or an accessory device) and communicate with that other device.

In one embodiment, the display device 200 may be a portable computing device dedicated to processing media such as audio and video. For example, display device 200 may be a media player (e.g., MP3 player), a game player, a remote controller, a portable communication device, a remote ordering interface, an audio tour player, or other suitable personal device. The display device 200 may be battery-operated and highly portable so as to allow a user to listen to music, play games or video, record video or take pictures, communicate with others, and/or control other devices. In addition, the display device 200 may be sized such that it fits relatively easily into a pocket or hand of the user. By being hand held, the display device 200 (or display device 100 shown in FIG. 1A or 1B) is relatively small and easily handled and utilized by its user and thus may be taken practically anywhere the user travels.

As discussed previously, the relatively small form factor of the display device 200, in certain embodiments, enables a user operate the device in environments with widely varying ambient lighting conditions, e.g., from total darkness to full, direct sunlight. Accordingly, embodiments of the invention provide for improved techniques of sensing such changes in ambient lighting conditions to enable a user to view the information presented on the display 210 of the display device 200 by controlling the device's display lighting 234.

Figure 3A:
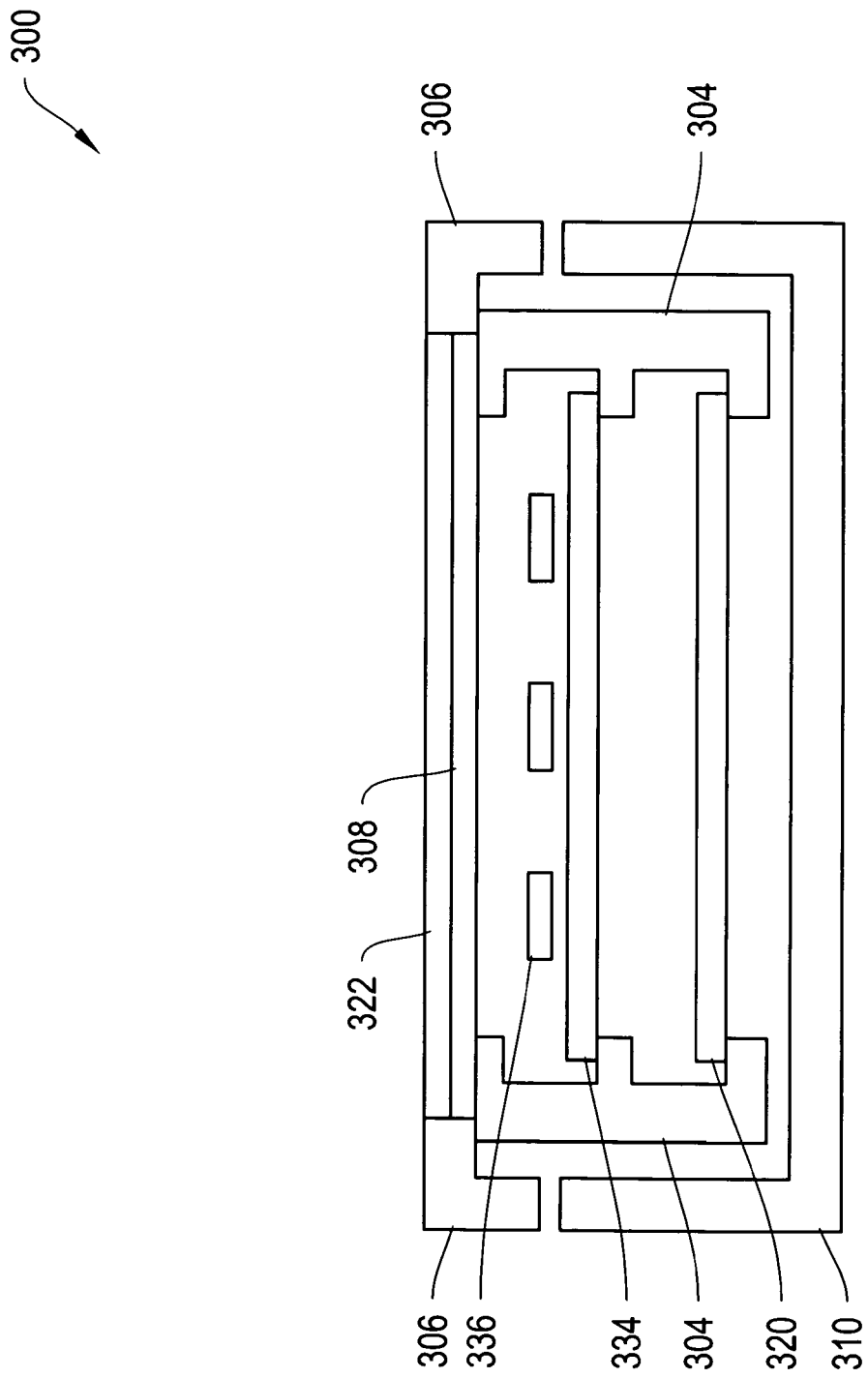
FIG. 3A shows a transverse sectional view of a display device including integrated ambient light sensors according to an illustrative embodiment of the invention.

FIG. 3A shows a transverse sectional view of a display device 300 including a display 308, a display lighting element 334 of variable brightness and internally-housed and/or integrated light sensors 336 according to an illustrative embodiment of the invention. The display device 300 may include an upper housing 306. The main structural frame 304 may be secured to the lower housing 310, which may be fabricated from a die-castable material using a die-casting process. The structural frame 304 may support a printed circuit board 320, the display lighting elements 334, the light sensors 336, and/or the display 308. The printed circuit board may include a processor, memory, and other product-specific functional elements such as the functional blocks described in FIG. 3A.

In certain embodiments, the display 308 includes a liquid crystal display (LCD). The most commonly used types of LCDs in use today include active matrix thin film transistor LCDs (TFT LCD). A LCD may include a two-dimensional regular rectangular array of picture elements or "pixels" organized into rows and columns. In a color LCD, each pixel may include three sub-pixels, one for each of the primary colors, e.g., red, blue, and green. A LCD is a transmissive display, meaning that each pixel (or sub-pixel in the case of a color display) filters some or all of the light passing through it from behind. In a monochromatic display, a pixel that is fully ON is the color of the display lighting elements 334.

In certain instances, the desired color of the display lighting elements 334 is a true white color or as close to true white as can be produced. If a pixel is partially ON, that pixel will be gray. If a pixel is fully OFF, that pixel will be black because it does not allow any light to pass through it. In a color display, each of the sub-pixels is set at a level so that the combined light produces the desired tone. For example, if yellow is desired, the red and green sub-pixels are set to be fully ON and the blue sub-pixel is set to be fully OFF. In certain embodiments, the light passes through an LCD in both directions.

In certain instances, a LCD can be usable without display lighting elements 334 by the inclusion of a reflector element behind the display. Thus, the information present by the display is viewable only by whatever ambient light is reflected through the display to the viewer. In certain embodiments, as illustrated in FIG. 3, display lighting elements 334 are included with the display 304 to allow for viewing in varying ambient lighting conditions. The display lighting element 334 may include an array of one or more light emitting diodes (LEDs), cold-cathode fluorescent lamps (CCFLs), or like lighting elements. LEDs are semiconductor devices that can be manufactured to produce a variety of different colors of light while consuming relatively little power or producing relatively little heat. In certain embodiments, the LCD display may include a backlight that can be one or more CCFLs mounted along the edges of the LCD or spaced uniformly over the back of the display, or it can be a string of light-emitting diodes (LEDs) arranged along the edges of the LCD or as a matrix over the back of the LCD assembly.

A LCD may include one or more arrays of LEDs. The LED arrays include white colored LEDs or may be a combination of red, blue, and green LEDs utilized together to produce a white light. In certain embodiments, the display lighting elements 334 may produce varying degrees of brightness under external control by, for example, the processor 202. This may be accomplished by: 1) varying the amount of power that is input into the display lighting elements 334 (known as amplitude modulation), 2) varying the amount of time that power is applied to the lighting elements (known as pulse width modulation), and/or 3) in the case where the display lighting elements 334 is comprised of more than one individually controllable lighting element, applying power to varying numbers of the lighting elements to modulate or adjust the lighting brightness level. Under certain conditions, due to the physical properties of the semi-conductor material of LEDs, there is often a measurable amount of light emitted from the display lighting elements 334 for a period of time after the external control, voltage, and/or power applied to the elements 334 has been turned off and/or removed.

The display 308 may include, without limitation, one or more of a transreflective LCD, active-matrix LCD (AM-LCD), anisotroropic conductive film, a cathode ray tube, a digital light processing (DLP) display, a field emission display (FED), liquid crystal on silicon (LCOS), organic light-emitting diode (OLED), plasma display panel (PDP), surface-conduction electron-emitter display (SED), and a vacuum fluorescent display (VFD). The display 308 may include certain categories of display devices such as, without limitation, a segment LCD, a dot matrix LCD, a graphic LCD, passive matrix LCD, and active matrix LCD. The display 308 may include a controller such as, without limitation, as PAN (hardware scrolling) control, frequency rate control (FRC), and palette color lookup table control.

In certain embodiments, the light sensors 336 may include one or more photodiodes, phototransistors, and/or like light sensing elements. One or more of these sensors 336 may be used to measure a broad spectrum of light. In one embodiment, at least one sensor 336 is tuned to be responsive to a narrow spectrum of light. In another embodiment, each of a plurality of sensors 336 is tuned to a different spectrum of light. For example, a photodiode may be tuned to be most responsive to the frequencies of light that are produced by the blue LEDs that are part of the display lighting elements 334. Therefore, a set of three photodiodes, one tuned to red, one to blue, and one to green, may be used to measure the amount of each light component being produced by a LED-based display lighting element 334.

Figure 3B:
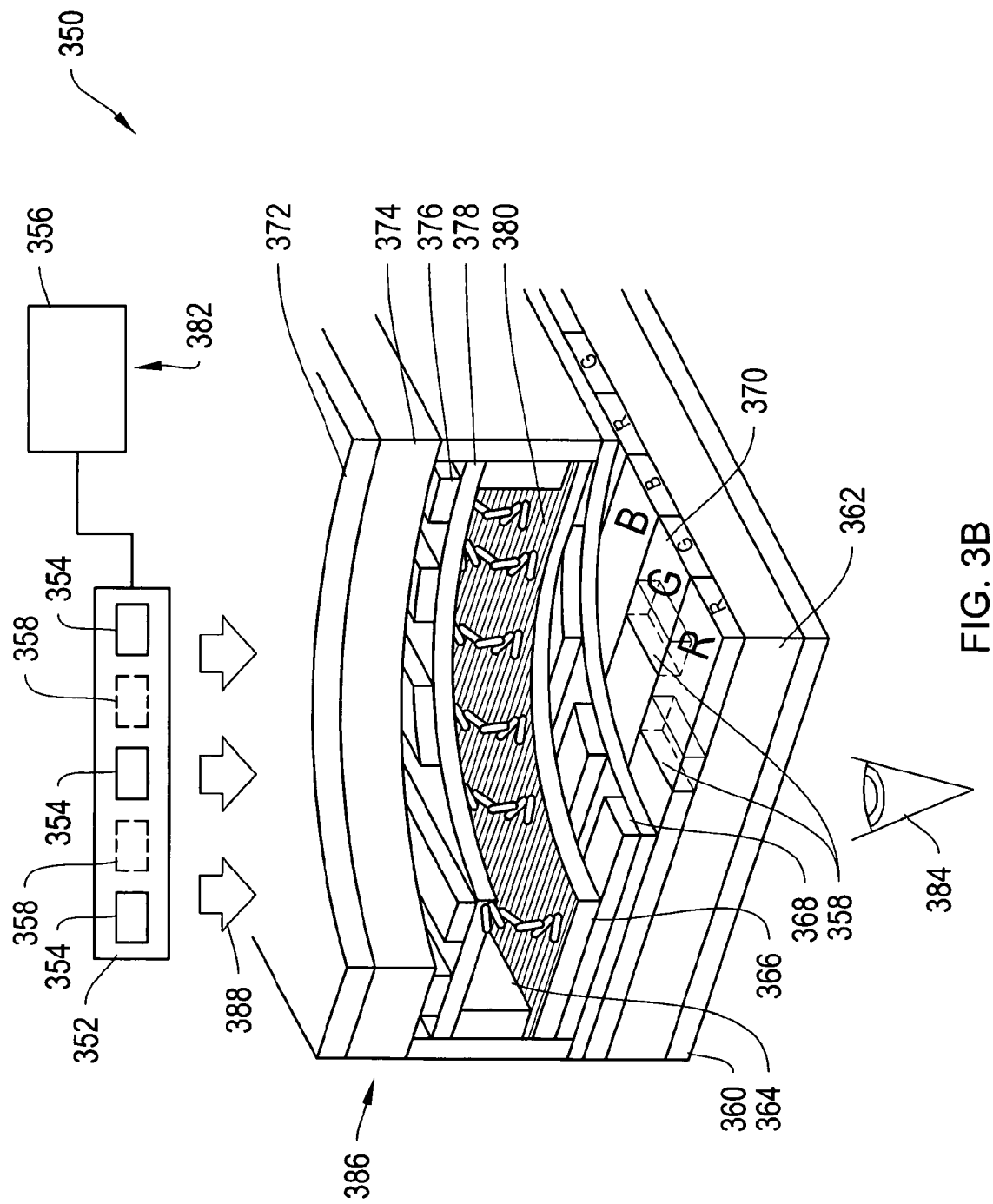
FIG. 3B is a diagram of a LCD-based display system including a backlight, embedded light sensors, and a backlight controller that controls the brightness of the light emitted from the backlight according to an illustrative embodiment of the invention.

FIG. 3B is a diagram of a color LCD-based display system 350 including a backlight 352, embedded light sensors 358, and a backlight controller 356 to control the brightness of the light 386 emitted from the backlight 352 according to an illustrative embodiment of the invention. The backlight 352 may include one or more lighting elements 354. In certain embodiments, the backlight 352 may include a semi-conductive substrate on which the one or more lighting elements are embedded and/or attached. The system 350 may also include a sandwiched structure 386 having a first polarizing filter 372, a first glass substrate 374, one or more first transparent electrodes 376, a first alignment layer 378, liquid crystals 380, a spacer 364, a second alignment layer 366, one or more second transparent electrodes 368, a color filter layer 370, a second glass substrate 362, and a second polarizing filter 360.

In one embodiment, one or more light sensors 358 are integrated with the R, G, and B filters of the color filter layer 370. The one or more light sensors 358 may be distributed throughout the color filter layer 370. The distribution may be random or predetermined to maximize light detection and/or minimize any impact on the resolution of the system 352. In other embodiments, the light sensors 358 may be included in any one of the various layers of the system 352.

In operation, the LCD-based display system 350, using the controller 356, controls the amount of light 386 emitted from the backlight 352 based on the measured ambient light detected by one or more light sensors 358. The controller 356 may be the processor 202 of FIG. 2 or may be another processor that is dedicated to the system 350. In one embodiment, the controller 352 is in electrical communication with the backlight 352 to control the power applied to the lighting elements 354. In another embodiment, the controller 352 is in electrical communication with one or more light sensors 358 via the connection 382 to enable the reception of light intensity information from the one or more light sensors 358. In one embodiment, an LED may also function as a light sensor.

The first and second polarizing filters 372 and 360 may control the light entering and leaving the sandwiched LCD structure 386 respectively. The first and second glass substrates 374 and 362 may provide electrical and physical insulation. The first and second transparent electrode layers 376 and 368 include electrodes that drive the LCD and include highly transparent material to minimize possible interference with image quality. The first and second alignment layers 378 and 366 may include films that are used to align the molecules of the liquid crystal 380 in a fixed direction. The spacer 364 maintains a uniform distance between the alignment layers 378 and 366, and the glass substrates 374 and 362. The color filter layer 370 includes a plurality of red (R), green (G), and blue (B) filters that enable to display of color images. In one embodiment, the backlight 352 emits light 386, over a variable interval and/or at a variable intensity, into the sandwiched structure 386 to control the light intensity observed by a user's eye 384.

In certain embodiment, one or more light sensors 358 may be located at the same layer and/or plane as the lighting elements 354. The one or more light sensors 358 may be dispersed among and/or interspersed with the one or more lighting elements 354 of the backlight 352. In one embodiment, the one or more light sensors 358 and/or lighting elements 354 are micromachined semi-conductive components in communication with a substrate of the backlight 352. The substrate may be planar and correspond with a portion of the planar surface of the polarizing filter 372.

In one embodiment, the controller 356 may automatically adjust the light output of one or more lighting elements 354 such that the illumination intensity of the system 350 is at an predetermined level above the ambient light intensity as measured by one or more light sensors 358. In other words, as the surrounding ambient light intensity varies, the controller 356 can vary the system 350 display illumination intensity level to maintain a predetermined difference in intensity level between surround light and the emitted light from the system 350.

Figure 4:
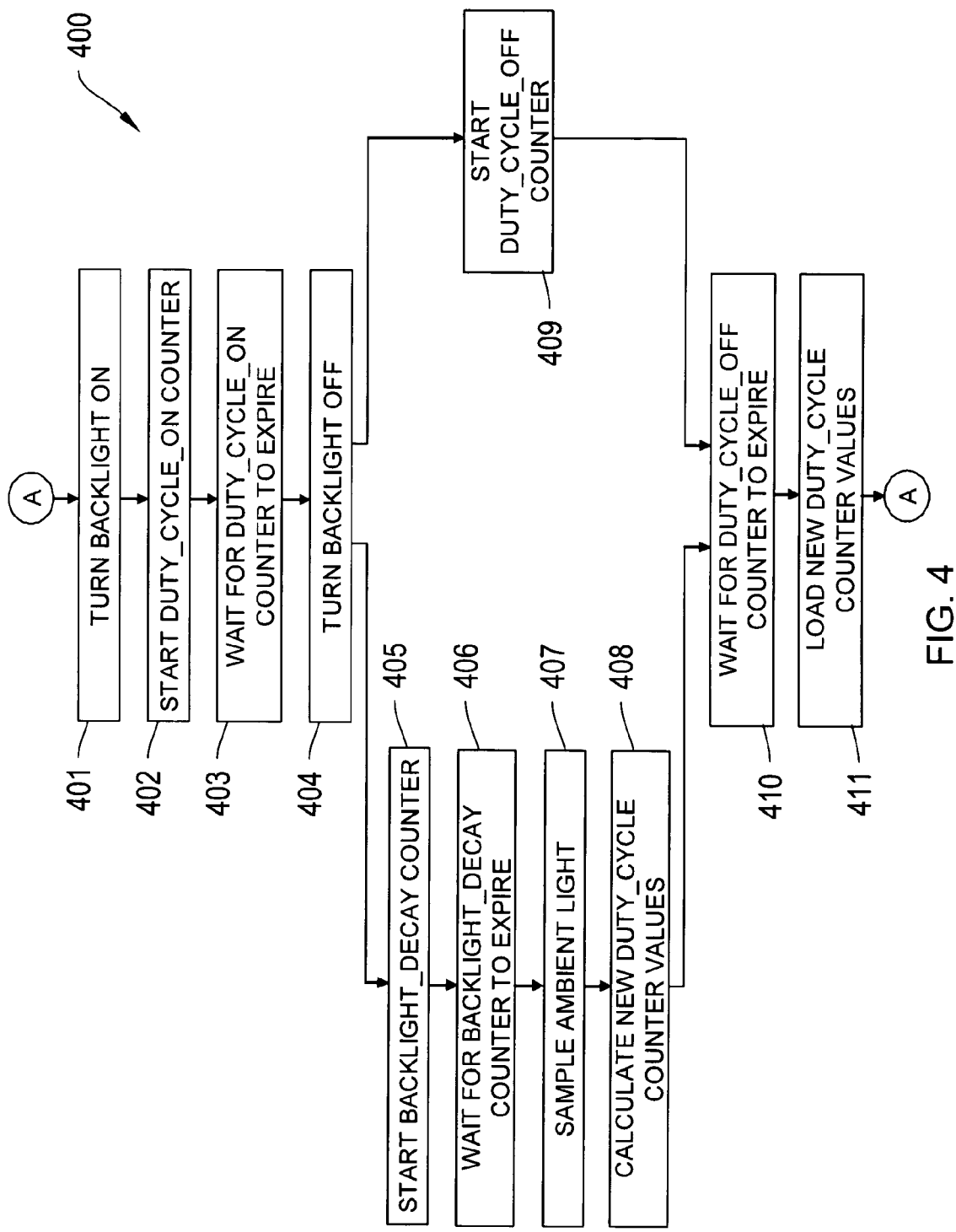
FIG. 4 is a flow diagram of a process for calculating lighting parameters based on sensed ambient light and characteristics of the device's display lighting components according to an illustrative embodiment of the invention.

FIG. 4 is a flow diagram of a process 400 for calculating the appropriate lighting parameters based on sensed ambient light and characteristics of the device's display lighting elements and/or components according to an illustrative embodiment of the invention. In certain embodiments, when the display device 100 is in an operating mode where the display 108 should be illuminated (e.g., the user has pressed a button 110 or touched the touchscreen 322), the processor 202 may activate and/or enable the display lighting 234 [Step 401]. The processor 202 may then retrieve from memory 220 or the storage device 204 a value for the amount of time or duration that the display lighting remains enabled, named the duty_cycle_on counter value in FIG. 4. The duty_cycle_on value may be calculated either by device default or user preference settings or by a previous iteration, cycle, or loop through the process 400. The processor 202 may use the duty_cycle_on value as an input to a timer and/or counter application to enable the timer to begin counting towards zero [Step 402]. The process 400 continues to apply power to the display lighting 234 until the duty_cycle_on timer reaches zero [Step 403]. After the duty_cycle_on time reaches zero [Step 403], the power period ends and the processor 202 removes power from the display lighting 234 or backlight [Step 404].

The processor 202 may then retrieve from memory 220 or the storage device 204 via the bus 218, a value for the amount of time for which no power is to be applied to the display lighting 234, known as the duty_cycle_off counter value. The duty_cycle_off value may be calculated either by device default or user preference settings or by a previous iteration, cycle, or loop through the process 400. The duty_cycle_off value may be loaded into a timer application of, for example, the processor 202 to enable the timer application to begin counting towards zero [Step 409]. The processor 202 may retrieve from memory 220 or the storage device 204 a value for the amount of time to delay the ambient light sensing after power is removed from the display lighting 234 (e.g., after the power period), known as the backlight_decay counter value.

The backlight_decay value may be based on a predetermined light emission decay characteristic of an lighting element 334, e.g., LED. In one embodiment, the light emission decay characteristic may include a non-linear decay constant. The decay constant may be based on the physical properties of one or more light elements 334. For example, a semi-conductor device or like device may continue to emit light energy after its power source is removed for an interval or period of time that decays at a linear or non-linear rate. Alternatively, the light emission decay characteristic may measured and/or calculated dynamically based upon the display lighting element 334 characteristics and the duty_cycle_on and duty_cycle_off values from a previous loop through the process 400. In one embodiment, the combined durations of the duty_cycle_on period and the backlight_decay period is duration of the illumination period.

The backlight_decay value may be input into a timer application of the processor 202 to enable the timer application to begin counting, for example, towards zero [Step 405]. The process 400 delays measuring ambient light until the backlight_decay timer reaches zero [Step 406]. After the backlight_decay interval is completed, the processor 202 then samples and/or measures the ambient light level from one or more light sensor elements 336 [Step 407]. In one embodiment, the sensing occurs during a sensing period. Based on the available ambient light measured by the sensor elements 336, the characteristics of the display lighting elements 334, the device default, and/or user-preferred display lighting level, the processor 202 may calculate new values for the duty_cycle_on, duty_cycle_off, and backlight_decay counter values for a subsequent lighting period [Step 408]. The process 400 waits until the duty_cycle_off timer reaches zero [Step 410]. Alternatively, instead of counting down, the processor may count up to a counter value. After the duty_cycle_off timer reaches zero [Step 410], the processor 202 may store the new calculated values for the duty_cycle_on, duty_cycle_off, and backlight_decay timer values into memory 220 or the storage device 204 via the bus 218 for use in the next loop, cycle, or iteration of the process 400 [Step 411]. If the processor 202 determines that display lighting is still needed, the process 400 repeats process 400 continuously by returning to Step 401.

Figure 5:
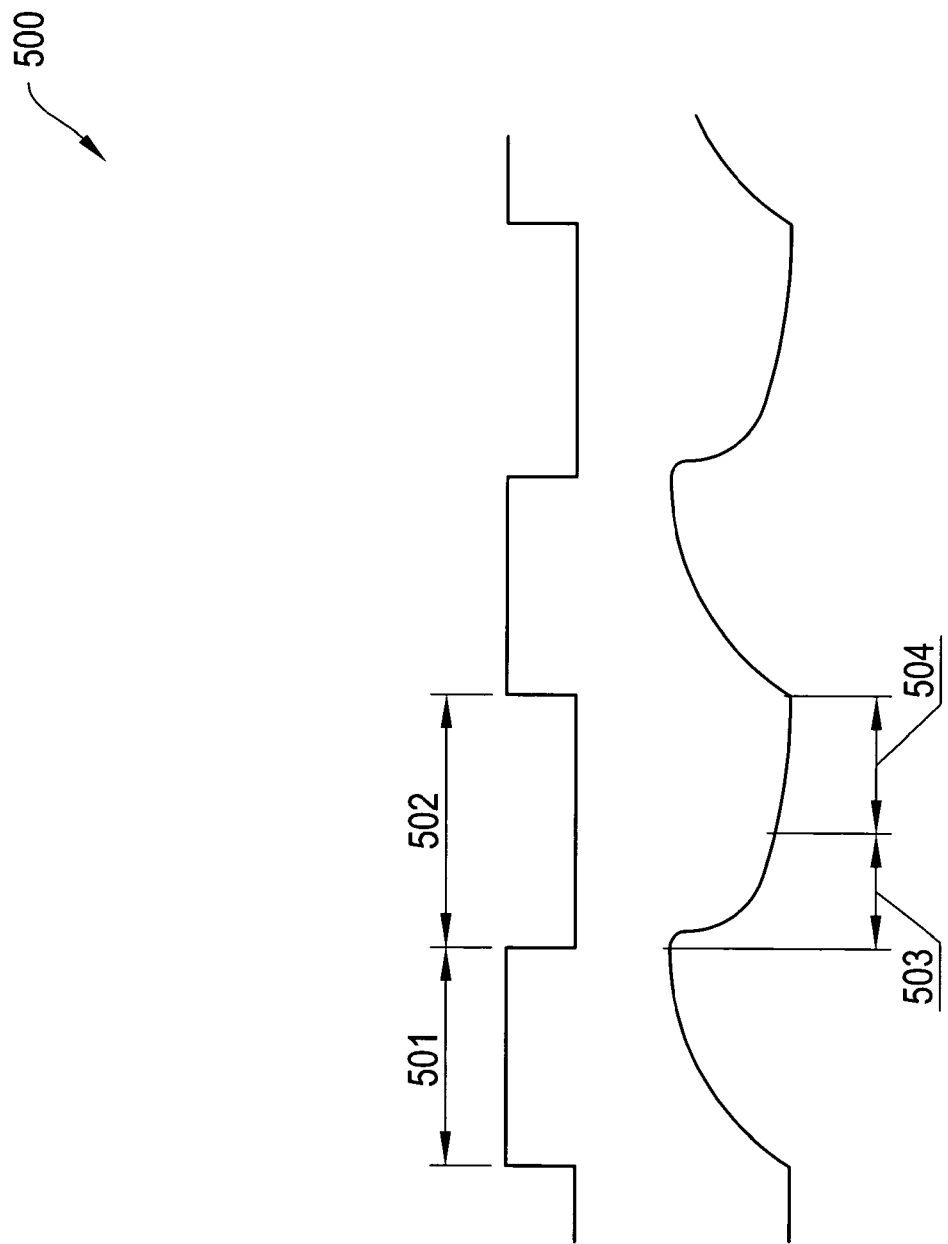
FIG. 5 is a signal timing diagram illustrating the determined timing values based, in part, on the certain device characteristics according to an illustrative embodiment of the invention.

FIG. 5 is a signal timing diagram 500 illustrating the relationship between the determined timing values and the device element characteristics to be accounted for according to an illustrative embodiment of the invention. In certain embodiments, the processor 202 controls the display lighting via a lighting control signal that is applied, for example, to one or more lighting elements 234 or 334.

The brightness of the display lighting elements 234 may be controlled and modulated using a pulse-width modulation (PWM) technique that includes a variable duty cycle. In one embodiment, there is a pair of on/off values, known as the duty_cycle_on 501 and duty_cycle_off 502 values that are also used in process 400. To make the display lighting elements 234 brighter, the duty_cycle_on 501 duration value may be increased while the duty_cycle_off 502 duration value may be decreased. To make the display lighting elements 234 dimmer, the duty_cycle_off 501 duration value may be increased while the duty_cycle_on 502 duration value may be decreased.

Depending on the physical characteristics of the display lighting elements 234 or 334, the amount of time it takes for the display lighting elements 234 to stop emitting light above a particular threshold, known as the backlight_decay time 503, may vary based on the duty_cycle_on 501 time, the duty_cycle_off 502 time, the ambient temperature, the age of the display lighting elements 234, the short-term and long-term cumulative power use of the display lighting elements 234, among other factors. The process 400 may take one or more of these factors into account to determine when a sampling, sensing, detection, and/or measuring window 504 of the light sensors 236 includes the actual ambient light conditions, and not any remaining light generated by the display lighting elements 234 or 334.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow.

What is claimed is:

1. An electronic device comprising:
   a display having an array of display pixels;
   a light source comprising at least first and second lighting elements for providing backlight illumination to the display during an illumination interval;
   at least one light sensor configured to receive light through at least a portion of the display and to generate a sensor signal based on an amount of light received, wherein the at least one light sensor is interposed between the first and second lighting elements; and
   a processor configured to receive the sensor signal during a sensing interval, wherein the sensing interval is synchronized with respect to the illumination interval, wherein the illumination interval comprises a delay period during which power is not applied to the light source and wherein the sensing interval begins a predetermined period of time after the delay period begins.

2. The electronic device defined in claim 1 wherein the array of display pixels is located in an active area of the display and wherein the at least one light sensor is located behind the active area.

3. The electronic device defined in claim 1 wherein the display comprises at least first and second display layers and wherein the at least one light sensor is interposed between the first and second display layers.

4. The electronic device defined in claim 1 wherein the display comprises a color filter layer and wherein the at least one light sensor is integrated with the color filter layer.

5. The electronic device defined in claim 1 wherein the at least one light sensor comprises a plurality of light sensors located behind at least a portion of the display.

6. The electronic device defined in claim 1 wherein the sensor signal is based on an amount of received ambient light and wherein the processor is configured to adjust an amount of power applied to the light source based on the amount of received ambient light.

7. The electronic device defined in claim 1 wherein the at least one light sensor comprises at least one of a photodiode and a phototransistor.

8. The electronic device defined in claim 1 wherein the first and second lighting elements comprise light-emitting diodes.

9. An electronic device comprising:
   an organic light-emitting diode display comprising a layer of colored display elements; and
   at least one light sensor integrated with the layer of colored display elements in the organic light-emitting diode display, wherein the layer of colored display elements comprises a first colored display element and a second colored display element, and wherein the at least one light sensor is interposed between the first and second colored display elements.

10. The electronic device defined in claim 9 wherein the at least one light sensor comprises an array of light sensors integrated with the organic light-emitting diode display.

11. The electronic device defined in claim 9 wherein the at least one light sensor is configured to receive ambient light and to generate a sensor signal based on the amount of received ambient light, the electronic device further comprising:
   a processor configured to receive the sensor signal.

12. The electronic device defined in claim 9 wherein the organic light-emitting diode display comprises an array of display pixels located in an active area of the organic light-emitting diode display and wherein the at least one light sensor is located in the active area.

13. An electronic device comprising:
   a display having an array of display pixels;
   a color filter layer;
   an array of light sensors integrated with the color filter layer, wherein the array of light sensors is configured to receive light and to generate sensor signals based on the amount of received light;
   a light source configured to provide backlight illumination to the display during an illumination interval; and
   a processor configured to receive the sensor signals during a sensing interval, wherein the sensing interval is synchronized with respect to the illumination interval.

14. The electronic device defined in claim 13 wherein the color filter layer comprises red, green, and blue color filters and wherein the array of light sensors are integrated with the red, green, and blue color filters.

15. The electronic device defined in claim 13 wherein the light source comprises a plurality of light-emitting diodes.

16. The electronic device defined in claim 13 wherein the sensor signals are based on an amount of received ambient light and wherein the processor is configured to adjust an amount of power applied to the light source based on the amount of received ambient light.

17. The electronic device defined in claim 13 wherein the illumination period comprises a delay period during which power is not applied to the light source and wherein the sensing interval begins a predetermined period of time after the delay period begins.

18. The electronic device defined in claim 13, wherein the color filter layer comprises a plurality of color filters, and wherein the light sensors in the array of light sensors are formed between the color filters in the color filter layer.

19. The electronic device defined in claim 9, wherein the colored display elements are colored sub-pixels and wherein the at least one light sensor is interposed between a first colored sub-pixel and a second colored sub-pixel.

* * * * *